Dec. 15, 1959 W. L. STANLEY 2,917,364
METHOD OF PRODUCING AMMONIUM SULFATE FROM ACID SLUDGES
Filed Dec. 30, 1957
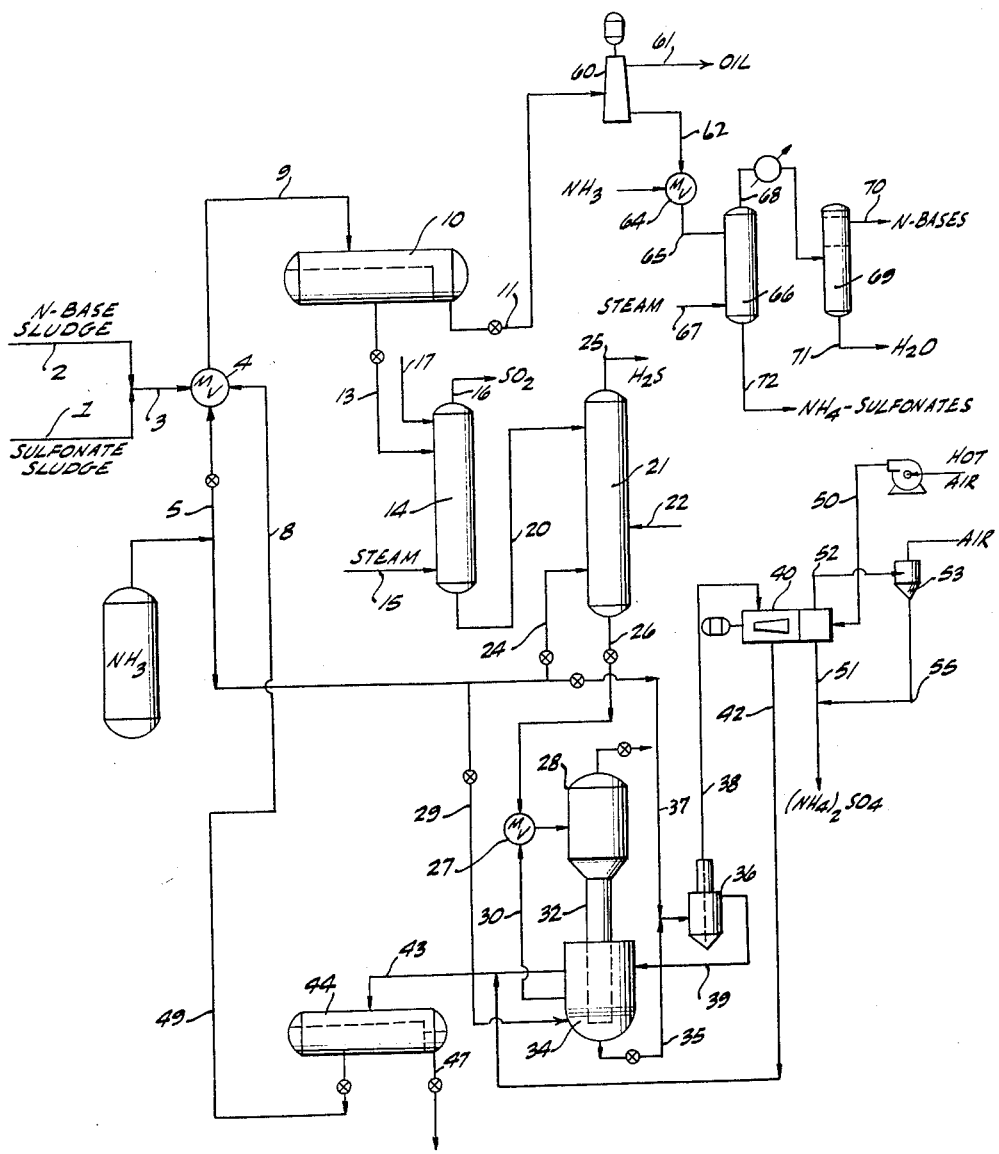
INVENTOR.
WILLIAM L. STANLEY,
BY
Lannas S. Henderson
AGENT

United States Patent Office 2,917,364
Patented Dec. 15, 1959

2,917,364

METHOD OF PRODUCING AMMONIUM SULFATE FROM ACID SLUDGES

William L. Stanley, South Pasadena, Calif., assignor to Union Oil Company of California, Los Angeles, Calif., a corporation of California Application December 30, 1957, Serial No. 706,028

14 Claims. (Cl. 23—119)

This invention relates generally to the treatment of acid sludges with ammonia to produce pure ammonium sulfate at minimum expense. The process also provides for the recovery of valuable organic constituents contained in the acid sludges, as e.g. nitrogen bases, sulfonic acids and hydrocarbons. The invention is specifically directed to the treatment of acid sludges which initially contain an unbalanced relative proportion of organic acids and organic bases, and as such are not well adapted for the production of clean ammonium sulfate as will be explained more fully hereinafter.

In broad aspect, the process comprises first adjusting the organic acid/organic base ratio of the sludge to fall within an optimum range hereinafter defined. This is effected by the addition thereto of extraneous nitrogen bases and/or by the addition of extraneous sulfonic acids, either of which may be added as such, or in the form of a second acid sludge containing a mole-excess of the desired addend. Then a phase separation of substantially all the organic constituents in the proportioned sludge is effected by adding thereto an aqueous recycle mother liquor derived from the subsequent ammonium sulfate crystallization step. Finally, ammonium sulfate is recovered from the resulting aqueous phase by stagewise neutralization and evaporation with ammonia. A small amount of ammonia may or may not be added to the sludge prior to the separation of the organic constituents. The organic phase initially separated is hence in equilibrium with a highly acidic aqueous solution which is substantially saturated with ammonium sulfate.

The recovered organic phase comprises mainly organic sulfonic acid salts of organic bases, organic acid sulfate salts of organic bases, and complex hydrocarbons. This organic phase as initially separated usually appears homogeneous, but upon standing is found to separate into a light hydrocarbonaceous phase, and a heavy phase rich in the aforesaid organic salts. These two phases may subsequently be separated, and the organic salt phase treated with ammonia for the recovery of nitrogen bases and ammonium sulfonates. The nitrogen bases and/or the ammonium sulfonates recovered may be employed to effect the initial adjustment in organic base/organic acid ratio of the feed sludge.

The principal objective of this invention is to provide methods for the treatment of acid sludges whereby substantially all of the organic components may be removed therefrom before any substantial neutralization with ammonia has taken place. More specifically, a major object is to insure that organic sulfonic acids and acid sulfates will be substantially completely absent from the subsequent evaporative crystallization steps, thereby avoiding problems of emulsification, foaming and gum accumulation during crystallization. A further object is to insure that heavy organic bases will be substantially absent during crystallization, thereby avoiding the formation of gummy or tarry deposits on the ammonium sulfate crystals, and on the crystallization equipment. A further object is to provide economical means for the stagewise neutralization and evaporation of acid sludges with ammonia in such manner that the heat of neutralization will supply substantially all of the heat requirements. A further object is to provide methods for recovering valuable organic materials from acid sludges.

The acid sludges treated herein normally result from the extraction of various hydrocarbon fractions with sulfuric acid for the removal of undesirable constituents therefrom. The nature of the sludge depends primarily upon the type of hydrocarbon feed which has been treated, upon the initial strength of the sulfuric acid, and upon the temperature of extraction. In general, concentrated sulfuric acids are employed ranging in strength from about 80% to 100%. Such acids may be employed for example to treat kerosene or solvent fractions to improve the color, and to remove gum-forming constituents. Kerosene and solvent fractions are normally substantially free of nitrogen bases, and hence the sludges resulting from their treatment contain little or no nitrogen base. The organic constituents contained in such sludges are believed to consist mainly of sulfonic acids, organic acid sulfates, and dissolved hydrocarbons. Typically, spent sludges from this type of treatment will contain from about 40–80% by weight of sulfuric acid, the remainder consisting largely of sulfonic acids, acid sulfates, hydrocarbons, and probably other complex materials.

Another type of sludge which may be treated herein consists of the spent alkylation acid which has been employed as a catalyst for the alkylation of isoparaffins with olefins. These sludges are normally substantially free from organic bases, and the organic constituents contained therein consist mostly of sulfonic acids and acid sulfates, together with some dissolved hydrocarbons. Spent alkylation acid normally contains about 80–95% sulfuric acid, the remainder being the aforesaid organic constituents.

In the acid treatment of stocks such as pressure distillate naphthas, especially where such naphtha is derived from a nitrogenous crude oil, or shale oil, the resulting sludges are substantially different in chemical makeup. The purpose of treating pressure distillate fractions with sulfuric acid is to remove nitrogen compounds, sulfur compounds, gum-forming polyolefins and the like. The resulting spent sludges normally contain from about 35–65% sulfuric acid, the remainder consisting mostly of nitrogen bases in the form of sulfates, and a minor portion of dissolved hydrocarbons and organic sulfates. A minor proportion of sulfonates may or may not be present.

It has been observed that when acid sludges of the type which are low in nitrogen bases, as for example those derived from the treatment of lubrication oil, solvent or kerosene fractions, or spent alkylation acid, are treated with ammonia for the recovery of ammonium sulfate, it is very difficult to separate all of the organic materials prior to the final crystallization stages. These organic sulfonates and acid sulfates are extremely troublesome in that they appear to inhibit crystal growth, and act as emulsifying agents, suspending the ammonium sulfate crystals in the mother liquor. In addition they tend to emulsify hydrocarbonaceous materials, nitrogenous materials, or gummy materials in the mother liquor with the result that gum deposits tend to accumulate in the crystallization units, and the separation of crystals from the mother liquor becomes difficult or impossible.

In U.S. Patent No. 2,331,235 it is proposed to avoid some of these difficulties by withdrawing a portion of the mother liquor continuously, mixing it with organic nitrogen bases and recovering therefrom an organic oil phase. The aqueous mother liquor is then separated and recirculated to the initial neutralization step. This procedure is disadvantageous in that it does not keep the so-called "sticky material" out of the evaporation and crystallization units, unless a very large proportion of mother liquor is continuously withdrawn. It would be highly desirable to provide methods for completely eliminating the gummy materials and emulsion-forming constituents prior to the evaporation and crystallization steps.

In the process of U.S. Patent No. 2,331,235, the nitrogen bases are added to mother liquor which is already completely neutralized with ammonia. I have discovered however that nitrogen bases can be added to the initial acid sludge, and provided that the aqueous phase is substantially saturated with ammonium sulfate, the organic acids in the sludge will still separate almost quantitatively from the aqueous phase, even though the aqueous phase may contain up to about 20% by weight of free sulfuric acid. Substantially complete separation of organic acids is obtained whenever there is present at least a stoichiometric ratio of organic bases, and preferably a slight excess. The essence of my invention hence revolves around the discovery that the salting out effect of the ammonium sulfate solution effectively opposes the tendency of the sulfuric acid contained therein to redissolve organic nitrogen bases. Manifestly, if too large a portion of the nitrogen bases were dissolved in the aqueous phase, this would prevent to that extent their ability to combine with and withdraw the organic sulfonic acids in the form of an insoluble oil phase. To the best of my knowledge it has not heretofore been known that highly acidic ammonium sulfate solutions could be freed of organic sulfonic acids and acid sulfates by adding thereto a sufficient quantity of organic nitrogen base.

It is a considerable advantage to be able to separate organic sulfonic acids and organic acid sulfates prior to the neutralization of sulfuric acid with ammonia. If the sulfuric acid is neutralized prior to separation of the organic materials, it is necessary to add a large amount of water in order to keep the ammonium sulfate from crystalizing and becoming contaminated with the organic phase. All of the exothermic heat of neutralization is generated at once, and it is difficult then to utilize such heat to effect controlled evaporation and crystallization. Moreover, this procedure does not necessarily avoid the dissolving of emulsion-forming sulfonic acids and the like in the mother liquor.

It is highly desirable to carry out the crystallization of ammonium sulfate gradually in stages with the gradual addition of ammonia. In this manner, the exothermic heat of neutralization may be utilized economically to effect evaporation without using expensive high-pressure vessels, and a minimum of water need be added to the system. My unexpected discovery that organic nitrogen bases can effect a substantially complete removal of organic acids from highly acidic ammonium sulfate mother liquors is of particular importance and value in connection with the multistage neutralization and crystallization of ammonium sulfate, since each stage thereof will automatically be free of emulsion-forming and gum-forming constituents, and it is not necessary to employ internal purification systems after the initial separation of the organic phase.

In cases where acid sludges high in nitrogen bases are employed, i.e. where there is a large stoichiometric excess of organic bases as compared to organic sulfonic acids and acid sulfates, other difficulties sometimes arise in the crystallization steps. The acidic ammonium sulfate recycle liquor will tend to dissolve as sulfates any appreciable mole-excess of organic bases. Where the original mole-excess of organic base is not large, this is not especially troublesome. The higher molecular weight organic bases remain in the oil phase combined with sulfonic acids, and the organic bases which dissolve in the aqueous phase are largely of low molecular weight, such that they can be mostly volatilized during crystallization.

However, where the mole-excess of nitrogen base is large, a proportionately larger quantity will be dissolved in the aqueous liquor, and the fraction dissolved may include high molecular weight bases, which may cause considerable difficulty in the crystallization steps. This difficulty is evidenced in the formation of tarry deposits upon the crystals which tend to cause agglomeration and the formation of tar balls in the crystallizer and dryer. To overcome this difficulty it is preferable to provide at least about one-fifth mole of organic acids per mole of organic bases present. Hence, in order to achieve all the benefits of the present invention it is necessary to provide in the original sludge mixture between about 1 and 5 moles of organic nitrogen bases per mole of organic acids, and preferably between about 1.1 and 2 moles.

By observing the precautions above specified it is found that the initial oil phase, which separates when the recycle liquor is contacted with the fresh sludge feed, will spontaneously separate further into a light oil phase which is mainly hydrocarbons, and a heavier oil phase which is composed mainly of organic base salts of the organic acids. The initial oil phase may hence be subjected to settling or centrifuging to separate the two distinct phases. The hydrocarbon phase may then be utilized as fuel or for any other desired purpose, and the organic salt phase may be treated with ammonia to recover free nitrogen bases, ammonium sulfonates, ammonium acid sulfates and the like.

The invention may perhaps be more readily understood by referring to the accompanying drawing which is a flow sheet illustrating one particular modification. The desired sulfonic acid-rich sludge, which is lean in nitrogen bases, is brought in through line 1, while the desired nitrogen base-rich sludge is brought in through line 2 and the two are combined in line 3 in proportions as outlined above. The sludge blend is then passed into mixing valve 4, wherein if desired a small proportion of anhydrous ammonia is added via line 5. The amount of ammonia added at this point is preferably only sufficient to raise the mixture to the desired temperature for oil separation. This is preferably about 175–250° F.

Recycle ammonium sulfate mother liquor from the crystallization step is added to mixing valve 4 via line 8. The proportion of mother liquor added at this point should preferably range between about 2 and 20 volumes thereof per volume of sludge blend. This mixture is then admitted to separator 10 via line 9, where the oil phase is allowed to rise and is withdrawn via line 11. The lower aqueous phase should contain between about 2% and 20% by weight of free sulfuric acid, and preferably between about 4% and 12%. This aqueous phase is then withdrawn via line 13 and transferred to a vacuum stripping column 14 for removal of sulfur dioxide, which is ordinarily present in the acid sludges. Steam at a temperature of about 250–350° F. is admitted via line 15, and passes upwardly countercurrently to the descending liquid from which sulfur dioxide is stripped. The vapors of steam and sulfur dioxide are removed overhead via line 16. An auxiliary stream of water may be admitted via line 17 in order to prevent crystallization at this point.

Stripped ammonium sulfate liquor is removed via line 20, and may then be transferred to an ammonia absorption tower 21 in which substantial neutralization is initiated. In absorption column 21 it is possible to utilize if desired an impure ammonia stream derived from the water washing of the effluent from thermal or catalytic cracking units. These cracking gases normally contain both ammonia and hydrogen sulfide which is removed by water washing. The resulting aqueous solution is then stripped and the mixture of steam, ammonia and hydrogen sulfide may be utilized in column 21 to which it is admitted via line 22. To utilize such an impure ammonia stream it is preferable to maintain column 21 at a temperature in excess of about 200° F., e.g. about 230–250° F. at atmospheric pressure, in order to prevent the absorption of hydrogen sulfide into the aqueous solution. If desired, an additional stream of ammonia may be admitted to the column via line 24. Gaseous overhead comprising mainly steam and hydrogen sulfide is removed via line 25. The partly neutralized aqueous phase is taken off via line 26 and sent via mixing valve 27 to vacuum crystallizer 28, in admixture with hot recycle mother liquor from line 30.

The combined liquor admitted to crystallizer 28 is ordinarily at about 140–200° F., and a considerable portion of water contained therein is flash evaporated at a pressure of e.g. 2–6 p.s.i.a. The resulting crystal slurry flows through barometric downpipe 32, into a suspension vessel 34. In suspension vessel 34 crystal growth occurs resulting in the settling of large crystals of ammonium sulfate. Ammonia is injected continuously or intermittently into the bottom of suspension vessel 34 at a rate sufficient to maintain the desired temperature and acid concentration. The sulfuric acid concentration in the combined liquor admitted to evaporator 28 should preferably be between about 1% and 3% by weight, e.g. 1.6%.

A concentrated slurry of large ammonium sulfate crystals is removed continuously from the bottom of suspension vessel 34 and transferred via line 35 to a slurry concentrator 36 where further settling takes place. If needed, sufficient ammonia may be added to the slurry via line 37 to effect substantially complete neutralization, i.e. to raise the pH of the liquor to about 4–7. However, the liquor withdrawn from line 35 is usually already within this pH range. The concentrated slurry from concentrator 36 is taken off via line 38 and admitted to a centrifuge-dryer 40, while mother liquor overflow is returned to suspension vessel 34 via line 39.

Excess neutral mother liquor from centrifuge-dryer 40 is withdrawn through line 42 and recycled via line 43 to a surge vessel 44. If desired, a portion of the mother liquor from suspension chamber 34, withdrawn near the top thereof through line 43, is also included with the mother liquor from the centrifuge. The relative volumes of mother liquors diverted to surge vessel 44 depends upon the volume of liquor desired in separator 10. In surge vessel 44, a small proportion of organic phase may separate which is withdrawn via line 47. Ordinarily, it is not necessary to remove any such organic phase, but for protection against temporary imbalance in the operation of the process, such a provision is made. The aqueous mother liquor in surge vessel 44 is then recycled via lines 49 and 8 as previously described.

Final drying of crystals in centrifuge-dryer 40 is accomplished by blowing hot air through line 50 into the crystalline mass which is contained in a rotating basket or reel. The substantially dry crystals of ammonium sulfate are removed through line 51 while the air used for drying is taken off via line 52. This gas stream will ordinarily contain suspended fine particles of ammonium sulfate and the suspension is therefore treated in cyclone separator 53, and the separated fines of ammonium sulfate are transferred to line 51 via line 55.

Going back to initial separator 10, the oil phase which accumulates therein is withdrawn continuously via line 11 and may if desired be sent directly to a centrifuge 60 to separate the two phases. Light hydrocarbonaceous oil is removed via line 61, and the heavy nitrogen base sulfonate oil is removed via line 62, and blended with ammonia in mixing valve 64. Sufficient ammonia is added at this point to "spring" the nitrogen bases, i.e. substantially a stoichiometric quantity. The resulting mixture is then transferred via line 65 to steam stripping column 66 to which steam is admitted via line 67. The steam acts to strip out the nitrogen bases which are removed overhead via line 68, condensed, and sent to separator 69, from which the supernatant nitrogen base phase is withdrawn via line 70, and the aqueous phase via line 71. The bottoms from steam stripping column 66 is removed via line 72, and consists largely of heavy ammonium sulfonates. This residue may be utilized in asphalt emulsions, or for other uses generally similar to those for which mahogany acid salts are useful.

Obviously the above procedure could be varied in many of its details without departing from the essential critical features of the invention. The ammonium sulfate recovery system illustrated is exemplary only, since any other equivalent system could be employed for the treatment of the aqueous phase from separator 10. The following examples may serve to illustrate more specifically the type of process herein contemplated, but should not be considered as limiting in scope.

EXAMPLE I

An acid sludge is obtained from the continuous, countercurrent extraction with 93% sulfuric acid of a Santa Maria Valley pressure distillate boiling between about 200° and 400° F., said pressure distillate containing by weight about 3.1% sulfur and 0.3% nitrogen, mainly in the form of nitrogen bases. Temperature of extraction is about 65° F. The resulting sludge is found to contain about 50% by weight of sulfuric acid, with about 40–45% of organic materials, mainly nitrogen bases.

This sludge was employed alone in the ammonium sulfate recovery system described above, utilizing a 5/1 volume-ratio of recycle ammonium sulfate liquor to sludge. The ammonium sulfate concentration in the mother liquor was about 30–35% by weight. Only sufficient ammonia was added at this point to raise the temperature to about 180° F. The resulting aqueous liquor contained about 9% by weight of free sulfuric acid. Upon separation of the organic phase, and treatment of the aqueous phase by stagewise evaporation as above described, it was found after about 20 hours of operation that gummy material had formed in suspension vessel 34 and centrifuge-dryer 40, causing the formation of sticky crystals which adhere to the surfaces. The ammonium sulfate product was dark and gummy in nature, and low in total nitrogen.

This example shows that the use of a sludge extremely rich in nitrogen bases, without adjustment of the organic acid content, leads to serious difficulty in the evaporation and crystallization units when the initial oil separation takes place under conditions of high acidity in the aqueous phase.

EXAMPLE II

The foregoing sludge treatment was repeated using an acid sludge derived from the scrubbing of kerosene with 95% sulfuric acid, the sludge containing about 65% free sulfuric acid, and about 20–30% of organic material, mainly in the form of hydrocarbons, organic sulfonic acids and organic acid sulfates. Within a few hours after initiation of the operation with this sludge it was found that severe foaming and emulsification occurred in suspension chamber 34 and evaporator 28. Little settling took place in vessel 34, the recycle liquor in line 30 having substantially the same composition as the concentrate withdrawn through line 35. The crystals formed in concentrator 36 and centrifuge-dryer 40 tended to stick and form amorphous masses due to their minute size, and the amount of fines blown out via line 52 was excessive. The liquor accumulating in surge vessel 44 also contained suspended crystal fines.

Substantially the same unfavorable results were obtained after about 5 days when the above operation was repeated using spent alkylation acid from an alkylation unit, said acid containing about 92% free sulfuric acid, and about 2–5% of organic sulfonic acids and acid sulfates, but substantially no nitrogen bases. These examples show that without adding nitrogen bases to sludges rich in sulfonic acids, and even where the initial oil separation is performed under highly acidic conditions, sufficient of the organic acids go into the aqueous phase to cause serious trouble in the crystallization and evaporation stages.

EXAMPLE III

Using a treating procedure identical to that described in the above examples, a sludge blend was employed comprising 50 volume-percent of the pressure distillate sludge of Example I and 50 volume-percent of the agitator sludge of Example II (derived from the treatment of kerosene). The initial oil separation was again performed under conditions of about 9% free sulfuric acid in the aqueous phase. Using this blend of sludges, it was found that stagewise evaporation and crystallization proceeded smoothly without foaming or emulsification, and without appreciable formation of gummy deposits. This operation could be continued indefinitely, showing that there is no appreciable accumulation of sulfonic acids or nitrogen bases in the evaporation and crystallization units. The ammonium sulfate recovered was of good crystal size, free flowing, and of light tan color.

An equally successful operation was obtained when two volumes of the agitator sludge per volume of pressure distillate sludge was used. The operation was also equally successful when two to four volumes of alkylation acid was employed per volume of pressure distillate sludge. It is clear therefore that so long as sufficient of the sulfur-containing organic acids are present to combine with the most deleterious nitrogen bases, and so long as sufficient nitrogen bases are present to combine with substantially all of the emulsion-forming organic acids, a clean separation of oil can be obtained even in equilibrium with a highly acidic aqueous phase, and clean ammonium sulfate can be produced from the aqueous phase by economical stagewise evaporation. These results are not obtainable using either type of sludge alone, or using excessive quantities of either.

Suitable proportions by volume of the sludges described in the foregoing examples are illustrated in the following table:

*Table 1*

|  | Pressure Distillate Sludge | Agitator Sludge | Alkylation Acid |
| --- | --- | --- | --- |
| Operative | 1 | 0.3–5 |  |
| Preferred | 1 | 1–3 |  |
| Operative | 1 |  | 0.5–8 |
| Preferred | 1 |  | 2–4 |

However, admixing the foregoing sludges in any proportions will effect an improvement over the use of any one of them singly.

EXAMPLE IV

This example illustrates subsequent treatment of the oil phase recovered from the blend of agitator sludge and pressure distillate sludge of Example III. Upon allowing the separated oil phase to stand at room temperature for several hours a second phase separation is noted. The mixture is then passed through a centrifuge and a heavy phase is recovered having a specific gravity of 1.15 and a light phase having a specific gravity of 0.96. The light phase makes up about 80% of the total volume of the original organic phase, and the heavy phase is the other 20%. Both phases were subjected separately to extraction with dilute sulfuric acid to recover nitrogen bases. The heavy phase was found to contain a concentration of nitrogen bases six times greater than that of the light phase. The light phase is essentially hydrocarbons suitable for use as fuel oil.

The foregoing disclosure of this invention is not to be considered as limiting since many variations may be made by those skilled in the art without departing from the scope or spirit of the following claims.

I claim:

1. A method for the treatment of an acid sludge with ammonia for the recovery therefrom of ammonium sulfate, which comprises first adjusting the mole-ratio of organic bases/organic acids in said sludge to between about 1/1 and 5/1, admixing the resulting sludge with concentrated ammonium sulfate mother liquor to provide an aqueous phase containing between about 2% and 20% by weight of free sulfuric acid, thereby forming an organic phase and an aqueous phase, separating said aqueous phase and neutralizing the same by adding ammonia in successive increments while concurrently evaporating water therefrom, thereby forming ammonium sulfate crystals, and then separating said ammonium sulfate crystals from the mother liquor.

2. A process as defined in claim 1 wherein said organic phase is recovered and subjected to a second phase separation without further chemical treatment, to recover therefrom a light hydrocarbonaceous oil phase, and a heavy organic salt phase, and decomposing said organic salt phase by the addition of an alkali to recover therefrom organic sulfonates and free organic nitrogen bases.

3. A process as defined in claim 1 wherein between about 2 and 20 volumes of said mother liquor per volume of total fresh sludge are recycled to said initial phase separation step, and wherein the sulfuric acid concentration of said aqueous phase is maintained at between about 4% and 12% by weight.

4. A process as defined in claim 1 wherein said adjustment of organic base/organic acid ratio is effected by blending two different acid sludges containing differing ratios of organic bases/organic acids.

5. A process for the treatment of a spent first acid sludge derived from the treatment of a hydrocarbon stock with concentrated sulfuric acid, said hydrocarbon stock being substantially free of nitrogen bases whereby the resulting acid sludge is substantially free of organic nitrogen bases but is rich in organic sulfur-containing acids, which comprises blending said first acid sludge with a spent second acid sludge derived from the sulfuric acid treatment of a hydrocarbon stock relatively rich in nitrogen bases whereby said second acid sludge is relatively rich in organic nitrogen bases, the proportions of said first and second acid sludges being adjusted so as to provide a resulting sludge blend containing at least sufficient organic nitrogen bases to provide substantially a stoichiometric equivalent thereof relative to the organic sulfur-containing acids in said second acid sludge, contacting said sludge blend with a concentrated ammonium sulfate recycle liquor to thereby form an organic phase and an aqueous phase, said aqueous phase being substantially saturated with ammonium sulfate and containing between about 2% and 20% by weight of free sulfuric acid, separating said two phases and subjecting said aqueous phase to stagewise neutralization by the gradual addition of ammonia, while concurrently evaporating water therefrom to produce ammonium sulfate crystals, and recovering substantially pure ammonium sulfate crystals from the resulting mother liquor.

6. A process as defined in claim 5 wherein said first sludge and said second sludge are blended in proportions calculated to give a sludge blend containing a mole ratio of organic bases/organic sulfur acids of between about 1/1 and 5/1.

7. A process as defined in claim 5 wherein said first acid sludge is derived from the sulfuric acid treatment of hydrocarbon fractions boiling in the solvent-kerosene range, and said second acid sludge is derived from the sulfuric acid treatment of a pressure distillate naphtha.

8. A process as defined in claim 7 wherein between about 0.3 and 5 volumes of said first acid sludge are employed per volume of said second acid sludge.

9. A process as defined in claim 5 wherein said first acid sludge consists of a spent alkylation acid, and said second acid sludge is derived from the sulfuric acid treatment of pressure distillate naphtha.

10. A process as defined in claim 9 wherein between about 0.5 and 8 volumes of said first acid sludge are employed per volume of said second acid sludge.

11. A process for the production of clean ammonium sulfate, which comprises blending a first acid sludge containing a stoichiometric excess of organic sulfur acids with respect to organic nitrogen bases with a second acid sludge containing a stoichiometric excess of organic nitrogen bases with respect to organic sulfur acids, said sludges being blended in predetermined proportions to yield a final blend wherein the ratio of organic bases/ organic sulfur acids is between about 1/1 and 5/1, admixing said blend with between about 2 and 20 volumes of concentrated ammonium sulfate recycle liquor, and with a small amount of ammonia sufficient to raise the temperature to between about 175° and 250° F., thereby forming an organic phase and an aqueous phase, separating said two phases, subjecting said aqueous phase to steam stripping to remove sulfur dioxide originally present in the sludge blend, and then subjecting the stripped aqueous phase to stagewise neutralization by the gradual addition of ammonia, and following each addition of ammonia subjecting the liquor to evaporation without further addition of heat, continuing said stagewise neutralization and evaporation until ammonium sulfate crystals are formed, and recovering said ammonium sulfate crystals from the final mother liquor.

12. A process as defined in claim 11 wherein the volume of mother liquor recycled to said initial separation step is controlled to provide an aqueous phase containing between about 4% and 12% by weight of free sulfuric acid and between about 30% and 35% by weight of ammonium sulfate.

13. A process as defined in claim 11 wherein said oil phase is subjected to a second phase separation without further chemical treatment to recover therefrom a light hydrocarbonaceous oil and a heavy organic salt phase, and wherein said organic salt phase is treated with ammonia to recover therefrom free organic bases and ammonium salts of organic sulfur acids.

14. A process as defined in claim 11 wherein said first acid sludge and said second acid sludge are blended in predetermined proportions to provide a mole-ratio of organic bases/organic sulfur acids of between about 1.1/1 and 2/1.

References Cited in the file of this patent

UNITED STATES PATENTS

| | | |
|---|---|---|
| 2,026,250 | Pyzel et al. | Dec. 31, 1935 |
| 2,331,235 | Ruys et al. | Oct. 5, 1943 |
| 2,648,594 | Olson | Aug. 11, 1953 |